(12) United States Patent
Rajvansh et al.

(10) Patent No.: US 11,510,466 B2
(45) Date of Patent: Nov. 29, 2022

(54) MULTI-FUNCTIONAL LUGGAGE

(71) Applicants: Gursimran Singh Rajvansh, San Ramon, CA (US); Ripam Deep Singh, Lafayette, IN (US)

(72) Inventors: Gursimran Singh Rajvansh, San Ramon, CA (US); Ripam Deep Singh, Lafayette, IN (US)

(*) Notice: Subject to any disclaimer, the term of this patent is extended or adjusted under 35 U.S.C. 154(b) by 591 days.

(21) Appl. No.: 16/222,563

(22) Filed: Dec. 17, 2018

(65) Prior Publication Data

US 2019/0254399 A1 Aug. 22, 2019

Related U.S. Application Data

(60) Provisional application No. 62/599,628, filed on Dec. 15, 2017.

(51) Int. Cl.
| | |
|---|---|
| *A45C 9/00* | (2006.01) |
| *B62B 7/06* | (2006.01) |
| *A45C 13/04* | (2006.01) |
| *A45C 13/00* | (2006.01) |
| *A45C 13/26* | (2006.01) |
| *A45F 4/02* | (2006.01) |
| *A45C 5/03* | (2006.01) |

(52) U.S. Cl.
CPC ............... *A45C 9/00* (2013.01); *A45C 5/03* (2013.01); *A45C 13/005* (2013.01); *A45C 13/04* (2013.01); *A45C 13/262* (2013.01); *A45F 4/02* (2013.01); *B62B 7/06* (2013.01); *A45C 2009/002* (2013.01); *A45F 2004/026* (2013.01)

(58) Field of Classification Search
CPC ............ A45C 9/00; A45C 11/00; B62B 7/06
USPC ............................... 280/30, 31, 32.7
See application file for complete search history.

(56) References Cited

U.S. PATENT DOCUMENTS

| | | | | |
|---|---|---|---|---|
| 1,140,997 A | * | 5/1915 | Minehart | A47C 1/146 190/8 |
| 2,170,227 A | * | 8/1939 | Weber | B62B 7/10 280/37 |
| 2,549,958 A | * | 4/1951 | Bosk | B62B 7/10 280/37 |
| 2,693,366 A | * | 11/1954 | Morris | B62B 7/10 280/37 |
| 3,413,011 A | * | 11/1968 | Weitzner | A45C 9/00 280/37 |

(Continued)

*Primary Examiner* — John K Fristoe, Jr.
*Assistant Examiner* — Justin Caudill
(74) *Attorney, Agent, or Firm* — Shook, Hardy & Bacon L.L.P.

(57) ABSTRACT

A multi-functional luggage includes a first frame positioned such that an outer face of the first frame includes elements for engaging with the ground. The luggage further includes a second frame operably connected to the first frame and a third frame operably connected to the second frame using a hinge structure such that the third frame pivots from a first position wherein the second frame and the third frame are contiguous to a second position wherein the third frame and the second frame are partially open in order to expose interior of the third frame and the second frame. The third frame and the second frame form a seat in the second position that is sized to support a human such that a torso of the human rests in the second frame and feet of the human rests in the third frame.

20 Claims, 14 Drawing Sheets

(56) References Cited

U.S. PATENT DOCUMENTS

| | | | | |
|---|---|---|---|---|
| 3,532,378 | A * | 10/1970 | Dalia | A45C 9/00 297/118 |
| 3,825,298 | A * | 7/1974 | Chipman | A47C 1/146 297/129 |
| 4,575,109 | A * | 3/1986 | Cowdery | A45C 5/00 190/18 A |
| 5,395,154 | A * | 3/1995 | Wang | A47D 1/02 280/30 |
| 5,899,467 | A | 5/1999 | Henkel | |
| 6,016,893 | A | 1/2000 | Chen et al. | |
| 7,354,049 | B2 | 4/2008 | Schmidt | |
| 7,793,970 | B2 * | 9/2010 | Fegler | B62B 5/082 280/643 |
| 8,016,089 | B1 * | 9/2011 | McNichols | A45C 9/00 190/8 |
| 2007/0007801 | A1 * | 1/2007 | Bishop | A45C 13/28 297/188.1 |
| 2007/0145700 | A1 * | 6/2007 | Ambrose | A45C 9/00 280/47.26 |
| 2008/0042379 | A1 | 2/2008 | Amran | |
| 2008/0223679 | A1 * | 9/2008 | Wong | A45C 13/385 190/18 A |
| 2010/0072012 | A1 | 3/2010 | Malinowski | |
| 2011/0256792 | A1 * | 10/2011 | Silver | A45F 4/02 446/71 |

* cited by examiner

MULTI-FUNCTIONAL LUGGAGE

RELATED APPLICATIONS

This application claims priority to U.S. Provisional Application No. 62/599,628, filed Dec. 15, 2017, the entirety of which is incorporated herein by reference in its entirety.

TECHNICAL FIELD

This disclosure relates generally to a luggage and, more particularly, to a multi-functional luggage that can convert into a portable carrier.

BACKGROUND

Travelers are usually inconvenienced by multiple pieces of luggage and strollers that the traveler might be trying to transport with him. In particular, the traveler might be carrying one or more children and might need to carry a baby car seat and a stroller along with him or a pet and a pet carrier along with him. Carrying multiple pieces of luggage including a stroller and/or a pet carrier can be a hassle because the traveler needs to move multiple pieces of luggage and the stroller carrying the child or the pet. Therefore, a multi-functional luggage which partially converts into a portable carrier such as a stroller or a wheeled carriage without the need to carry additional carrier in the trip would be beneficial.

SUMMARY

A luggage according to this disclosure, in particular a multi-functional luggage, includes a first frame, a second frame, and a third frame. The first frame is positioned such that an outer face of the first frame includes elements for engaging with the ground. The second frame is operably connected to the first frame. The third frame is operably connected to the second frame using a hinge structure such that the third frame pivots from a first position wherein the second frame and the third frame are contiguous to a second position wherein the third frame and the second frame are partially open in order to expose interior of the third frame and the second frame. The third frame and the second frame form a seat in the second position that is sized to support a human such that a torso of the human rests in the second frame and feet of the human rests in the third frame.

In some embodiments, the third frame and the second frame define a contour such that in the second position the second frame adapted to form a back rest and a seat member for the for the human and the third frame is adapted to form a foot rest for the human and in the first position the third frame folds such that the third frame and the second frame are presented substantially in a side-by-side relation to form a complete enclosure.

In some embodiments, the hinge structure is configured to allow the third frame to pivot in front of the second frame and position below in order to adapt into a seat.

In some embodiments, the seat is sized to accommodate at least one of a baby, a toddler, a car seat, a child, an adult, a pet, one or more bags, and one or more objects such that the multi-functional luggage functions as a portable carrier.

In some embodiments, an opening mechanism is configured to connect the second frame with the third frame in the first position to form the complete enclosure or disconnect the third frame with the second frame in the second position.

In some embodiments, a surface of the luggage is designed to have a visual design based on the defined contour of the third frame and the second frame.

In some embodiments, the hinge structure can include a latch, a seal to interlock the third frame and second frame together, a fabric hinge, a living hinge, or a conventionally used hinge in a luggage.

In some embodiments, the third frame includes another ground engaging element configured to (i) support the third frame in the second position and enable the multi-functional luggage to function as a portable carrier when the luggage is positioned in an upright vertical manner (ii) support the multi-functional luggage in the first position and enable the multi-functional luggage to function as a scooter when the luggage is positioned in a horizontal manner, and (iii) support the multi-functional luggage in the first position and enable the multi-functional luggage to be steered or pulled when the luggage is positioned in the horizontal manner.

In some embodiments, the another ground engaging element of the third frame can be extended when the third frame is in the second position in order to engage with a ground or retracted inside the third frame when the third frame is in the first position.

In some embodiments, a third position, the second frame is further extended such that a back rest formed by the second frame is in a reclining position and the third frame forms a substantially flat surface to allow the human to lay back substantially in a horizontal position, and the another ground engaging element of the third frame further extends and protrudes a predetermined length outwards to support mobility of the luggage in the third position.

In some embodiments, in the third position, the reclining angle of the second frame can be adjusted to one or more angles.

In some embodiments, the second frame further includes material designed to fold in a compact manner in the first position by contracting bellow folds and open in the second position by expanding the bellow folds.

In some embodiments, the material is positioned in the outer sides of the second frame and is made of a strong fiber material.

In some embodiments, the interior of the third frame and the second frame include a layer of cushion on top of the third frame and the second frame, the cushion arranged to expand and open in sized and outer edges of the third frame and the second frame to enhance comfort of the human seated in the seat.

In some embodiments, a handle bar operable connected to the second frame such that the handle bar is designed to stretch out at one or more angles, elevate to one or more heights, and clip into position in order to steer the multi-functional luggage.

In some embodiments, the handle bar is designed to stretch out to the one or more angles and elevate to the one or more heights based on at least one of the upright vertical position of the luggage, horizontal position of the luggage wherein the luggage is being used as a scooter, reclining angle of the second frame in the second position.

In some embodiments, the first frame is designed to open and expand to allow for storage of objects.

In some embodiments, the second frame and the third frame include compartments for storage and plugins for electrical devices.

In some embodiments, one of the compartments in the second frame and the third frame is located on the outer edge of the second frame and the third frame.

In some embodiments, a stroller includes a first frame positioned including an outer face with elements for engaging with a ground. The stroller further includes a second frame operably connected to the first frame using a hinge structure such that the second frame pivots from a first position wherein the first frame and the second frame are contiguous, to a second position wherein the first frame and the second frame are at least partially open in order to expose the interior of the first frame and the second frame. The stroller further includes wherein the first frame and the second frame form a seat for the stroller in the second position that is sized to support a human such that a torso of the human rests in the first frame and a feet of the human rests in the second frame when the elements of the first frame engage the ground. The first frame includes one or more compartments to store objects and the second frame pivots front and down such that the human faces the operator of the stroller pushing the stroller.

DETAILED DESCRIPTION

For the purposes of promoting an understanding of the principles of the embodiments described herein, reference is now made to the drawings and descriptions in the following written specification. No limitation to the scope of the subject matter is intended by the discussion of any one embodiment. This disclosure also includes any alterations and modifications to the illustrated embodiments and includes further applications of the principles of the described embodiments as would normally occur to one skilled in the art to which this document pertains, including the combination, substitution, or non-inclusion of various features from various embodiments.

Figure 1:
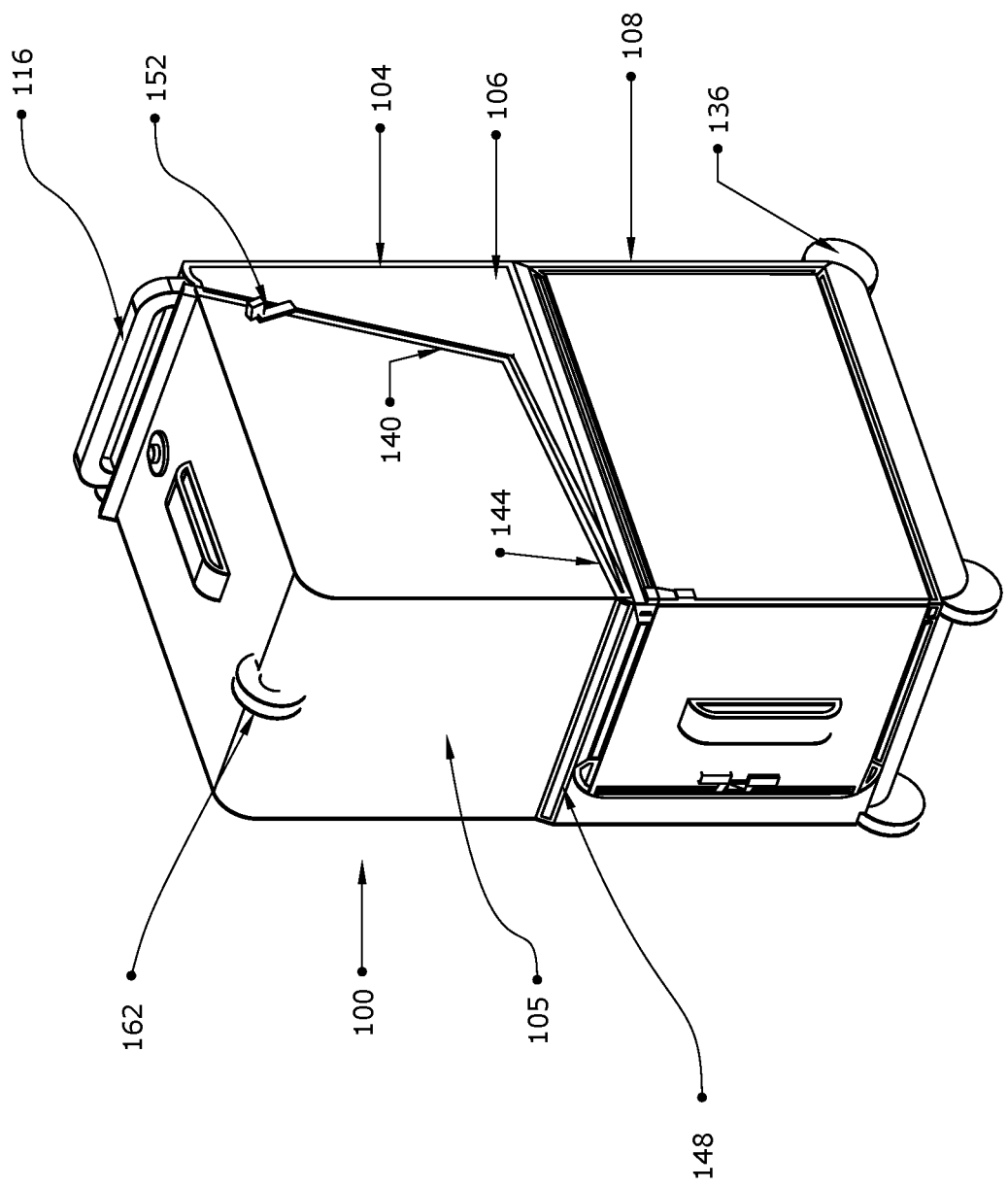
FIG. 1 is a perspective image illustrating an exemplary embodiment of the luggage according to the disclosure.

FIG. 1 is a perspective image illustrating an exemplary embodiment of the luggage 100 according to the disclosure. In one embodiment, the luggage 100 includes a first frame 108, a second frame 106 and a third frame 105. The first frame 108 includes elements to engage with the ground such as one or more wheels 136. The second frame 106 is operably connected to the first frame 108. The second frame 106 in one example could be mounted on top of the first frame 108 when the luggage 100 is positioned in the upright vertical position as illustrated in FIG. 1. It is understood that the second frame 106 could be positioned on the side of the first frame 108 or the second frame 106 could protrude in an outward manner in relation to the first frame 106. It is also understood that in one example, the first frame 108 and the second frame 106 could be merged and considered as one frame.

The luggage 100 further includes a third frame 105 that is operably connected to the second frame 106 and/or the first frame 108. The third frame 105 could be connected to the second frame 106 and/or the first frame 108 using a hinge structure 148 such that in a first position, the third frame 105 and the second frame 106 are contiguous. In another example, the hinge structure 148 can connect the third frame 105 with the first frame 108 and/or second frame 106 or the rest of the frame can connect using the hinge structure 148 in any combination. FIG. 1 illustrates an exemplary embodiment of the luggage 100 in the first position. In one example, in the first position, the third frame 105 and second frame 106 define a complete enclosure 104. The complete enclosure 104 could form the top portion of the luggage 100 when the luggage is in an upright vertical position. In another example, the complete enclosure 104 could form the side portion or the bottom portion of the luggage 100 as well. In one example the hinge structure 148 allows the third frame 105 to pivot out in front and below the second frame 106 such that in a second position the second frame 106 and the third frame 105 are partially open and partially expose the interior of the second frame 106 and the third frame 105. The hinge structure 148 allow the third frame 105 to open such that the third frame 105 and the second frame 106 adapt into a seat or a carrier. The hinge structure 148 can include hinges used in conventional pieces of luggage or can include a latch, a seal to interlock the third frame and second frame together, a fabric hinge, a living hinge, or a conventionally used hinge in a luggage, or a combination thereof. It is understood that the luggage 100 could be a soft shell luggage or a hard shell luggage or a combination thereof.

In the second position, when the second frame 106 and the third frame 105 are partially open, they form a seat. The seat is sized to fit a human such as a baby, a toddler, a child, a teenager, or an adult. The seat can also be sized to fit pets such as dogs, cats or the like. The seat can also be sized to fit different sizes of baby car seats. The seat can also be sized to fit one or more different pieces of luggage or bags such as handbags, shopping bags, different types and kinds of luggage, and the like. The seat can also be designed to expand to fit one or more children, one or more humans, or one or more pets.

The first frame 108, the second frame 106, and the third frame 105 are designed so that the luggage 100 can be steered either in the upright vertical position or a horizontal position. As such, the first frame 108, the second frame 106, and the third frame 105 include one or more elements to engage the ground 136, 162 such as wheels in different parts of the luggage 100. The first frame 108, the second frame 106, and the third frame 105 also include handles 116 that can expand, twist, and stretch out in different angles and length in order comfortably to steer, push, or pull the luggage 100 whether the luggage 100 is in an upright vertical position or a horizontal position.

As further illustrated in FIG. 1, the second frame 106 and the third frame 105 define a contour design or shape 140, 144 in such a manner so that when the second frame 106 and the third frame 105 are in the second position, the top part 140 of the second frame 106 forms a back rest for the seat and the bottom part 144 of the second frame 106 forms a seat member on which the human sits. An example of the contour design 140, 144 is illustrated in FIG. 1. It is possible to have other designs for the contour shape 140, 144 that will allow the third frame 105 and the second frame 106 to form a closure. In one example, the contour shape is designed to allow the third frame 105 to partially separate from the second frame 106 and/or first frame 108 and/or rest of the body of the luggage 100. In one example, the contour design 140, 144 can include a straight line or a wavy line connecting one end of the enclosure 104 to the other end of the enclosure 104. In another example, the contour design 140, 144 can connect different portions of the enclosure 104 together such as middle of the enclosure 104 to the end of the enclosure. The contour design 140, 144 can allow part of the luggage 100 to partially open along the contour design 140, 144 into a seat. The contour design 140, 144 can be made up of multiple parts and section the enclosure 104 in different ways. In one example, the contour design allows the third frame 105 to become a foot rest. The contour design allows for the second frame 106 and the third frame 105 to form a complete enclosure 104 in the first position and as such the second frame 106 and the third frame 105 are presented substantially in a side-by-side relation in the first position. In one example, the contour can be of different shapes for example a zig-zag shape diagonally down the enclosure 104, steps diagonally down the enclosure 104, or a straight line connecting one end of the enclosure 104 to the other end of the enclosure 104, or a combination of different shapes such that when the third frame 105 partially opens, it forms a seat or a carrier in which a human, a pet, or multiple objects can be placed. In one example, the third frame 105 can include multiple parts such that when the third frame 105 pivots down, it forms steps on which the feet can rest or use to climb down or up to the seat. It is understood that in other embodiments, the size and contour of the shape of the opening and the shape of the first, second, or third frame 108, 105, and 106 can be changed such that the luggage 100 can convert into a portable carrier.

The second frame 106 and the third frame 105 can be connected in the first position by an opening mechanism 152 such as a zipper, one or more latches, one or more buttons, one or more hooks, or the like, an automatic interlocking mechanism that guides and enables the second frame 106 and the third frame 105 to lock when the second frame 106 and the third frame 105 are close to each other or are touching each other or in any other manner. In one example the interlocking mechanism can include a protruding lip running around the edge of the second frame 106 and the third frame 105. It is understood that the opening mechanism 152 can include other conventional methods to manually or automatically connect two frames together. In one example, the user of the luggage 100 is able to open the opening mechanism using buttons located on the outside of the luggage 100, by using a smart electric device such as a phone, watch or the like, or by using voice or hand, foot, or body motions.

Figure 2:
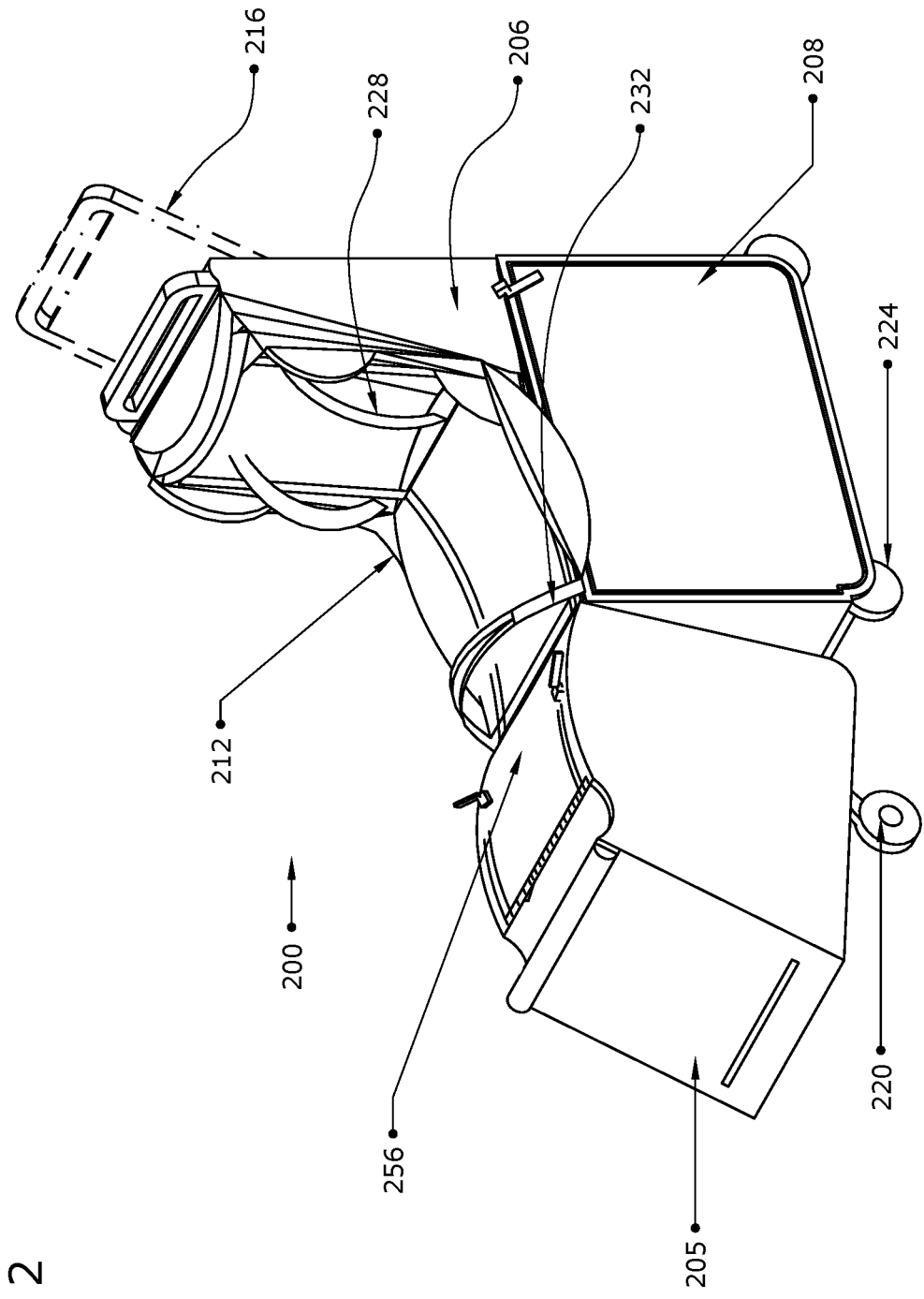
FIG. 2 is a perspective image illustrating the luggage transformed into a portable carrier according to an exemplary embodiment of the luggage.

FIG. 2 is another perspective image illustrating the luggage transformed into a portable carrier according to one exemplary embodiment of the luggage 200. FIG. 2 illustrates an exemplary embodiment of the luggage 200 in the second position. As illustrated in FIG. 2, the third frame 205 can pivot out and towards the ground such that the luggage 200 partially converts into a portable carrier, the interior of the third frame 205 and the second frame 206 reveal the seat 256 or carrier in which the human can sit. In one example, the third frame 205 pivots away from the second frame 206 such that one side of the third frame 205 is in a side by side relation with another side of the second frame 206 and/or the first frame 208. In another example, the third frame 205 pivots from a horizontal position into a substantially vertical extending position in which is extends to a location relatively close to the ground. In another example, the third frame 205 pivots to a location spaced a predetermined distance upwardly from the ground to provide sufficient area for the ground engaging elements 220 to engage with the ground in order to enable the luggage 200 to be steered. The third frame 205 is configured to be pivoted from folded, transport positon in the first position in which the third frame 205 is folded to be contiguous with the second frame 206 to the second position in which the third frame 205 extends in a vertical extending position. In this second position, the third frame 205 is secured to one side of the second frame 206 using the hinge structure 148. In one example the hinge structure 148 is designed to expand or contract in order to enable the third frame 205 to partially open into a seat 256. The hinge structure 148 may include multiple parts that allow the third frame 205 to open and remain in position when the third frame 205 is in the second position.

In one example, the first frame 208 includes mechanisms to engage the third frame 205 when the third frame 205 is in the second position so that the third frame 205 is locked and does not move. In one example, the first frame 208 may include mechanisms to engage with the third frame 205 in order to guide the third frame 205 to remain in place when the ground engaging elements 224 of the first frame 208 engage with the ground.

The user of the luggage 200 is able to steer the luggage 200 using handles 216 located on one side of the luggage 100. For example, one of the handles 216 can be located on one side of the second frame 206. As such, in this example, the human sitting in the portable carrier faces away from the user of the luggage 200 such that the user of the luggage 200 pushes the luggage 200 from behind the human. In another example, the third frame 205 can pivot in another direction such as behind the luggage 200 and below so that the human sitting in the portable carrier 256 now faces the user pushing the luggage 200. In one example, the second frame 206 can pivot and lock in to different directions allowing the user sitting in the seat to any desired direction. For example, the second frame 206 can pivot to allow the human sitting in the portable carrier 256 to either face the user or face away from the user pushing the luggage 200.

In the example where the human seated in the seat 256 faces the user pushing the luggage 200, the contour of the opening between the third frame 205 and the second frame 206 are configured so that when the third frame 205 partially pivots open to partially reveal the interior of the third frame 205 and the second frame 206, the backrest of the seat 256 faces the user pushing the luggage 200 and on the other side of the luggage 208. In this example, the handle 216 can be designed to be a handle bar that is positioned around the human seated in the seat 256 and can be raised to let the human get out of the seat 256 or lowered to allow the user to push the luggage 200 or opened in any other manner to let the human out of the seat 256. The handle bar in this example can be shared by the human sitting in the portable seat 256 and the user of the luggage 200 when the human and the user are facing each other. In another example, the handle bar 216 could extend from the first frame 208 to enable the user to push the luggage 200 with the human seated facing the user 200. In another example, the handle bar 216 can be made up of multiple parts such as a pair of handles extending from each side of the second frame 206 and/or third frame 205 that can be moved towards each other to form the handle bar 216 and moved away from each other to allow the human seated in the seat 256 to be able to climb out of the seat 256. Other examples of locations of handle bar 216 is possible to enable the user to push the luggage 200 such as handle bars 216 extending from the bottom of the first frame 208 that can be extended and stretched out.

FIG. 2 further illustrates that the first frame 208, second frame 206, and the third frame 205 can include multiple elements to engage the ground, for example wheels. In one example, the third frame 205 can include one or more elements to engage with the ground 220, 224 such as wheels such that when the third frame 205 is in the second position, the one or more ground engaging elements 220, 224 can engage with the ground in order to provide stability and enable the luggage 200 to be easily steered. It is understood that other examples of ground engaging elements can be used such as tracks, wheels, or the like in order to enable the luggage to be portable. In one example, the one or more wheels 220, 224 can expand or contract based on the topography of the ground. The one or more wheels 220, 224 can either automatically or manually expand or contract. In one example the one or more wheels 220, 224 can expand or contract using buttons located on the stroller or through the user's electrical devices such as smart phone, watch or voice commands or body motions. The one or more wheels 220, 224 can be designed to be hidden or partially hidden when not in use or in display.

FIG. 2 further illustrates that the interior of the second frame 206 and the third frame 205 include cushions 212 to provide comfort to the human seated in the portable carrier 256. In one example, the cushions 212 are configured to expand and adjust to provide comfort to the human. In another example, the cushion 212 is configured to expand in different ways based on whether a human is seated, the size of the human, or whether a pet is seated in the portable carrier 256. For example, there can be different settings of the cushion based on which human is sitting on the cushion. In another example, the cushion 212 is configured to expand towards the sides and outer edges of the second frame 206 and the third frame 205 to provide comfort towards the edges of the seat 256.

FIG. 2 further illustrates that the interiors second frame 206 and the third frame 205 can include other features such as straps 228, 232 to safely secure a child or baby seated in the seat 256 or even a pet seated in the seat 256. The second frame 206 and the third frame 205 can also include a cover structure such as a canopy to enclose the second frame 206 and the third frame 205 in the second position so that a pet seated in the seat 256 is enclosed and can't escape. The cover structure to enclose the seat 256 can include materials such as a strong lightweight fabric, a mesh made up of fabric or other materials or the like that allow the pet in the seat 256 to be able to breath, look out, and the user of the luggage 200 to be able to see their pet 256 without the pet being able to escape the seat 256. In one example, the cover structure can enclose the third frame 205 when the third frame 205 is in the first position or the third frame 205 can be made up of a material such that a pet can be placed inside the enclosure 104 when the third frame 205 and the second frame 206 are in a contiguous position. The first frame 208 can have four wheels 224 or any other number of wheels 224 or any other ground engaging elements. The second frame 206 and the third frame 205 may also have additional wheels 220, 224. In one example, the luggage 200 may have straps 232, 228 to help fasten the infant or child to the seat 256. In another example, the luggage 200 may have additional hooks to clip a baby car seat onto the luggage 200. The baby car seat can be positioned to allow the child to be facing the person operating the luggage 200. The additional hooks may allow a pets leash to be tied onto the seat 256. In other examples, additional straps 232 can be provided to keep the seat together. The additional straps 232 may also help provide additional support to the infant or child sitting on the seat.

FIG. 2 further illustrates that the luggage 200 can include one or more handle bars 216. The handle bars 216 can be located anywhere on the luggage 200 and enable the luggage 200 to be steered in any position such as the upright vertical position or a horizontal position. The handle bar 216 can extend in a manner that allows the luggage 200 to be used as a stroller and enables the person operating the luggage 200 to either push the luggage 200 forward or pull the luggage 200. In another example, the handle 216 can extend at different angles and clips to that position to enable the person operating the luggage 200 to drive the luggage 200 forward or pull the luggage 200 behind them or drag the luggage 200 sideways. In one example, depending upon the angle the seat 256 is reclined at, the handle bar 216 can extend outward in different lengths and in different angles to allow the user of the luggage 200 to steer the luggage 200. The handle 216 may have a contoured grip that enables the person operating the luggage 200 to easily push or pull the luggage either with one hand or with both hands. The handle 216 can be configured to twist and rotate based on the comfort of the user of the luggage 200 and the human in the seat 256.

Figure 3:
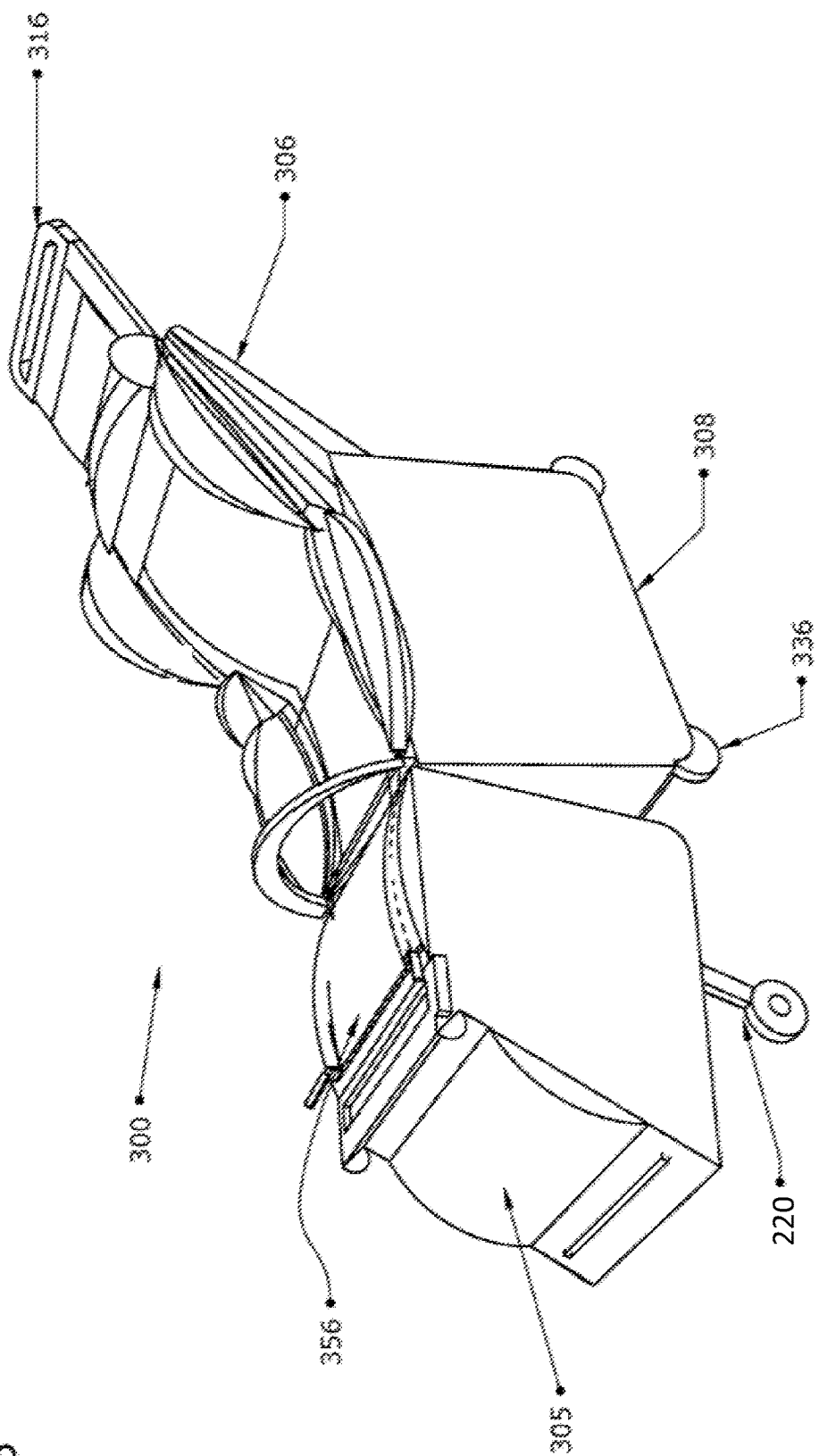
FIG. 3 is a perspective image illustrating the luggage transformed into a portable carrier in a recline position according to an exemplary embodiment of the luggage.

FIG. 3 illustrates an exemplary embodiment of the luggage 300 such that a human can lie in the seat 356 in a reclined position. In one example, the top part of the second frame 306 is reclined at an angle in order to allow the human in the seat 356 to recline in any position. The human in the seat 356 can either lie down or partially recline. The second frame 306 and the third frame 305 can partially open in such a manner as to form a substantially horizontal flat surface 356 for the human to lie inside. In another examples, the second frame 306 and the third frame 305 can partially open in different reclining positions as well. With each reclining position, the wheels 220, 336 can be expanded and protrude outwards in different predetermined lengths and angles in order to support the mobility of the luggage 300. In another example, with each reclining position, the one or more handle bars 316 around the luggage 300 can be expanded and stretched out to different angles to allow the user of the luggage 300 to comfortably steer the luggage 300 while the seat 356 is in a reclined position. In one example, there may be additional support elements such as wheels that extend and protrude out from the first frame 308 in order to support the seat 356.

Figure 4:
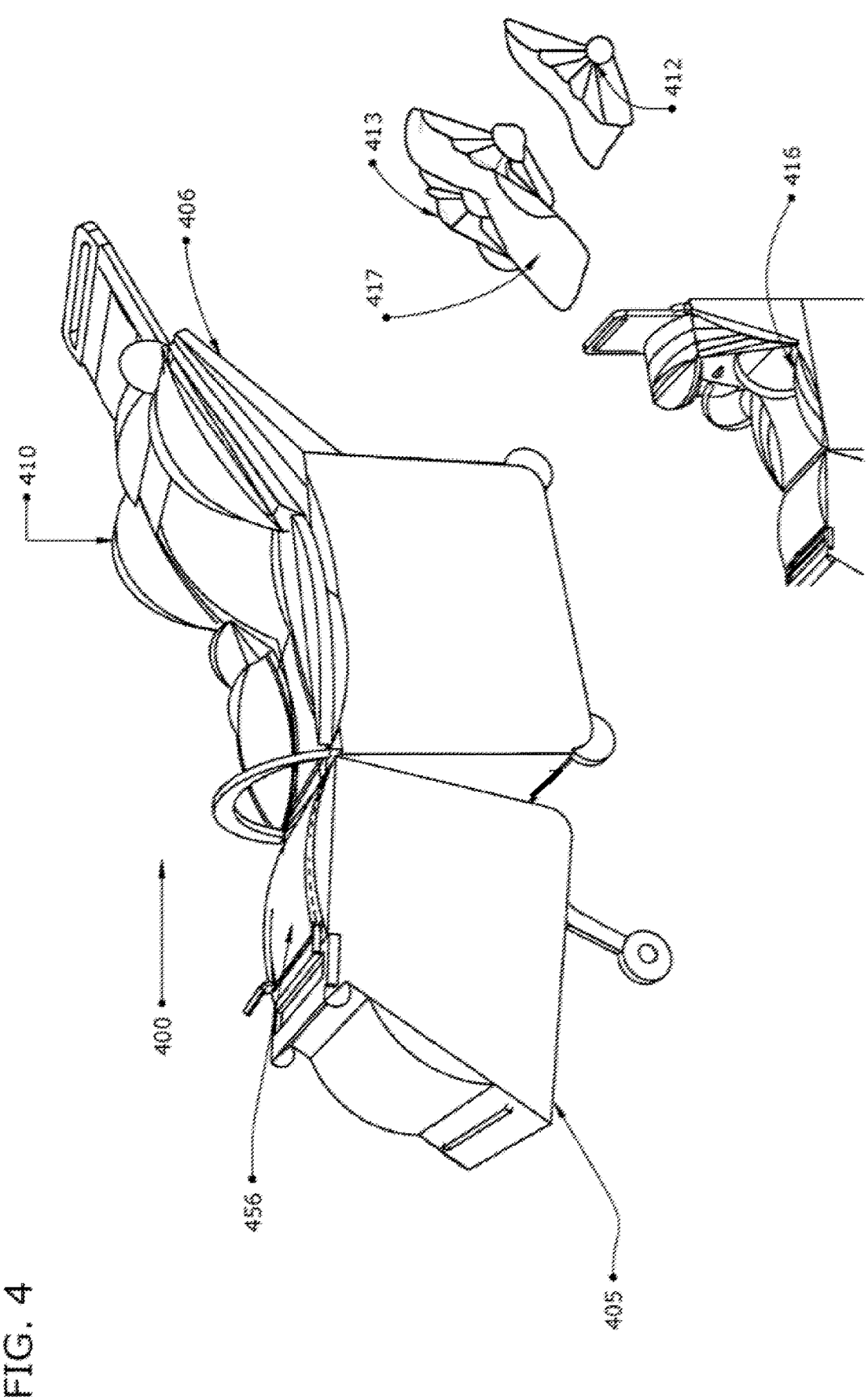
FIG. 4 is a perspective image illustrating an exemplary embodiment of how the luggage opens to form a portable carrier.

FIG. 4 illustrates another embodiment of the multi-functional luggage 400. In one embodiment, when the second frame 406 and the third frame 405 are in the second position to partially form a seat 456, the second frame 406 and/or the third frame 405 can include materials 410 along the edges of the second frame 406 and/or the third frame 405 that allow for the second frame 406 and the third frame 405 to fold in a compact manner. For example, the material 410 can include bellow folds 410, 412, 413, 416, 417 as in an accordion that allow for the second frame 406 and/or the third frame 405 to close in a compact manner by contracting bellow folds and open in the second position by expanding the bellow folds. In one example the folds can create accordion pleats or fan folds. This material 410 on the side may be folded in such a manner to allow the fabric to expand 410 when the seat is opened and contract when closed. For example, the material 410 may be designed in an accordion style to enable it to expand 413, 417 when the third frame 405 opens and contract 412, 416 when third frame 405 closes. In one example, when the third frame 405 is in the second position, the second frame 406 includes the accordion style opening mechanism such that when the material 410 is in an open position 413, it illustrates an accordion style study opening. The material 410 can contract 412. The material 410 can contract 416 when the third frame 405 is in the second position or expand 417 to allow for additional support around the edges. As such, the material 410 can comprise an accordion type covering member that allows for a study opening mechanism. The material 410 can be made up of a strong fiber or a web based fiber. It is understood that the material 410 can be made of different other types of materials. As such, the material 410 can be collapsed or expanded in an accordion-like manner. The fold includes accordion pleats or fan folds that can be folded and unfolded. In one example, the folds enable the second frame 406 to be pivotally interconnected to the third frame 405. In one example, the material 410 is designed to allow the human in the seat 456 to sit comfortably inside the seat 456 and not fall off the seat 456.

In another example, the material 410 can expand and contract in different configurations based on settings from the user either through buttons on the luggage 400 or external commands from a mobile device, voice commands, hand gestures, or the like. The material 410 may be made of varied materials such as a web based fabric, cotton, polyester, plastic, or the like. The material 410 may be strong and light weight. The material 410 can also allow for additional support and protection on the sides of the seat 456.

Figure 5:
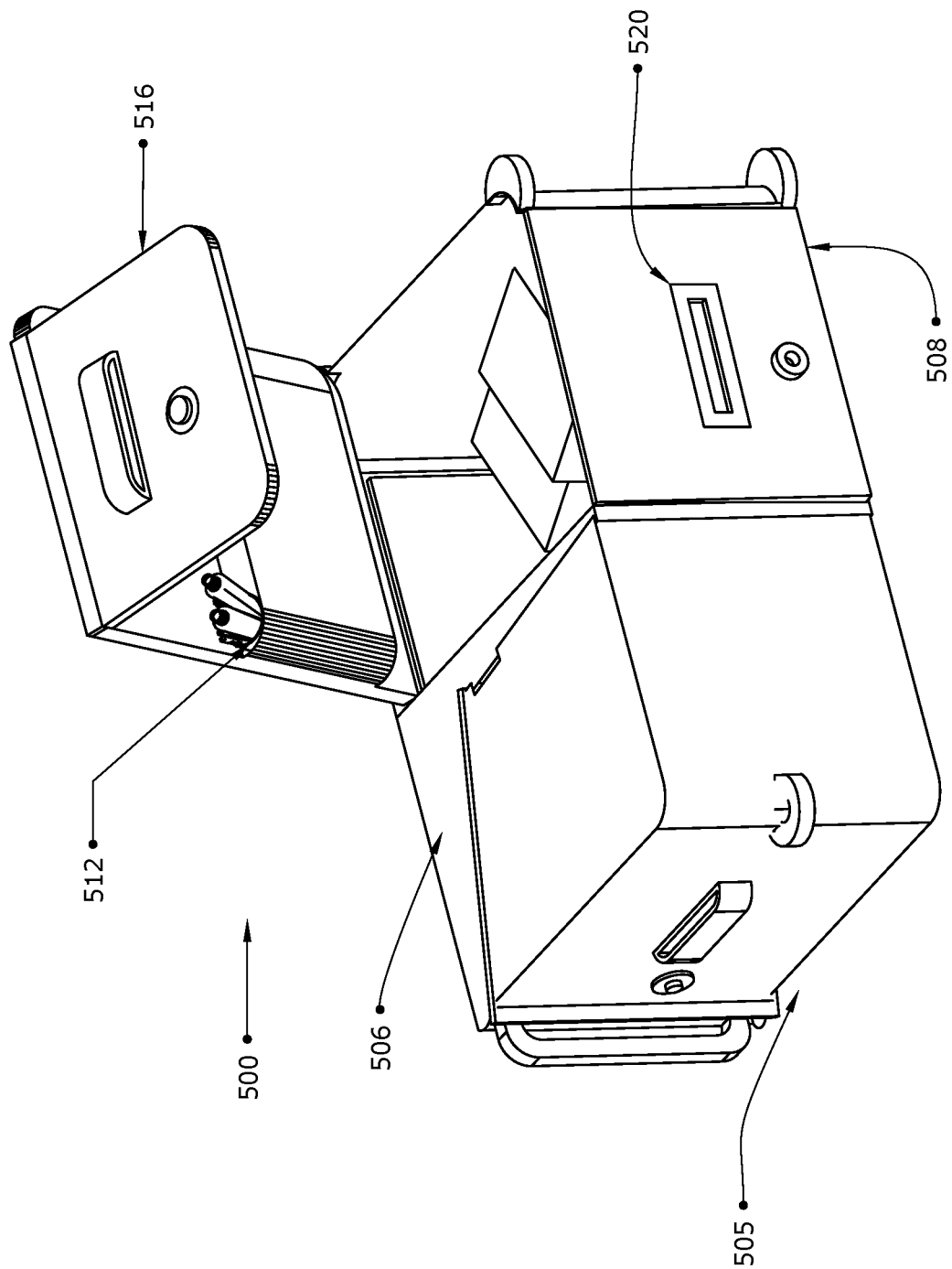
FIG. 5 is a perspective image illustrating an exemplary embodiment of storage compartments in the luggage.

FIG. 5 illustrates another embodiment of the multi-functional luggage 500. In one example, the first frame 508 opens using any conventional luggage mechanisms such as zippers, latches or the like. In another example, the first frame 508 opens using a locking mechanism 520 such as a trunk style lock. It is understood that other conventional locking mechanisms 520 can be used to close and lock the first frame 508. It is understood that other methods of locking and opening both the first frame 508 and the second frame 506 and the third frame 505 can be used. In one example, the locking mechanism 520 can be configured to attach to the third frame 505 when the third frame 505 is in the second position. The first frame 508 can have pockets 512 for additional storage. The first frame 508 can be expanded 516 so as to increase the storage size of the first frame 508 for additional storage. In one example, the second frame 506 and the first frame 508 can define one structure and not two separate structures.

Figure 6:
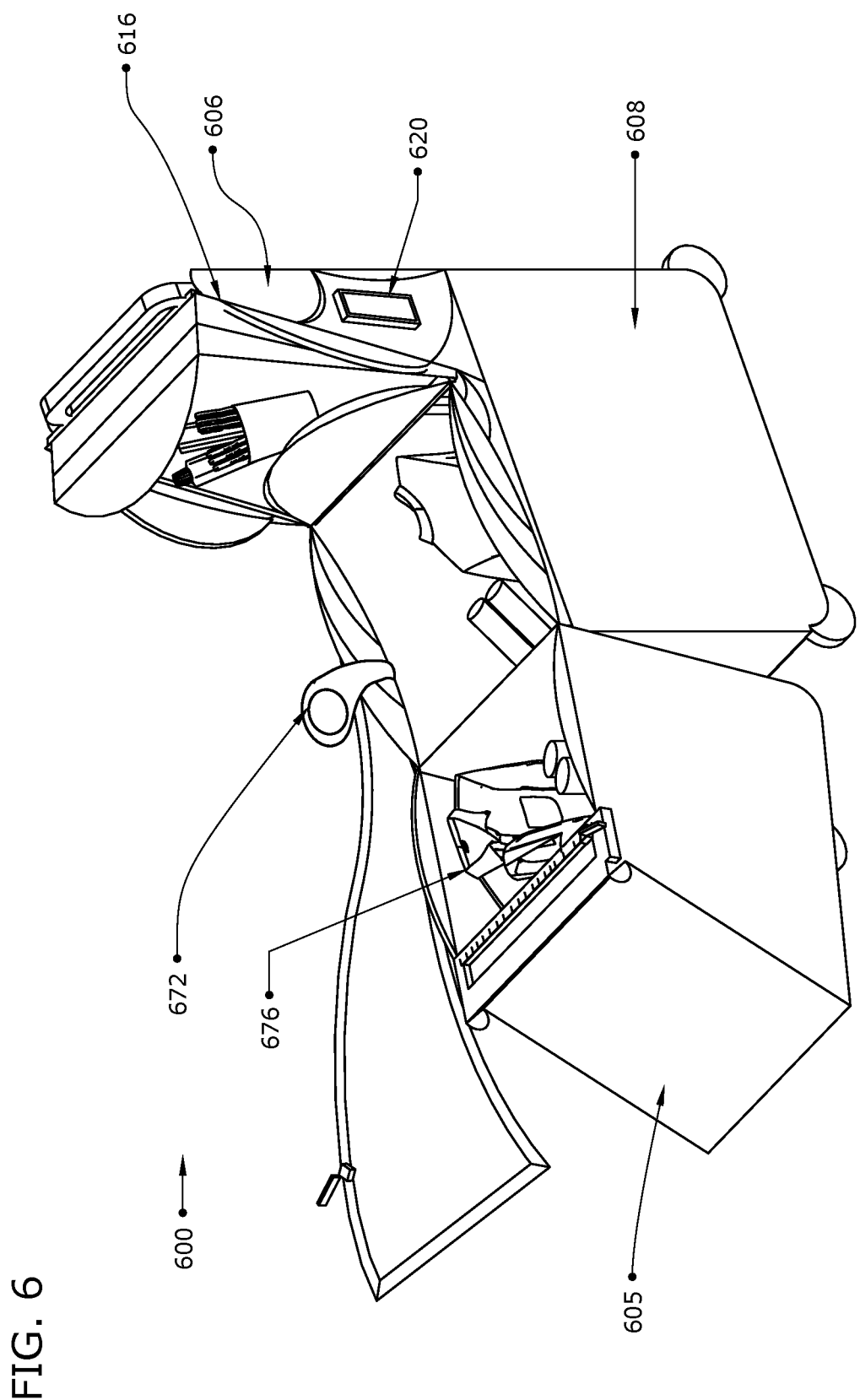
FIG. 6 is another perspective image illustrating another exemplary embodiment of additional features in the luggage.

FIG. 6 illustrates another embodiment of the multi-functional luggage 600. In one example, the third frame 605 and the second frame 606 have compartments 672, 676 for additional storage. For example, the interior or exterior portion of the third frame 605 can partially open using a zipper or other conventional mechanisms and allow for additional storage. In one example, the third frame 605 can include additional storage that can be opened using mechanisms such as zippers and on which the human can rest their feet. The storage 676 can be either opening on the top portion of the third frame 605 when the third frame 605 is in the second position or the storage 676 can be opened on the side of the third frame 605 when the third frame is in the second position or the like. The storage 672 can be located on the edges of the third frame 605 and the second frame 606. The storage 672 can be opened using mechanisms such as zippers or the like. The upper portion 616 of the second frame 606 includes pockets 616 for additional storage of items such as accessories, smart devices, bottles, food, toys, books, or the like. The upper portion 616 of the second frame 606 may also include hidden compartments that can be opened with either with a zipper or other mechanism and allows for additional storage. The sides 620 of the second frame 606 may have locations for smart device plugins, battery packs, or GPS locators. In another example, the sides 620 of the second frame 606 have a hidden cup holder that can be extended out to place cups when in use. The sides 620 of the second frame 606 may also have additional storage pockets that enable the storage of items such as tickets, identification cards, passports, or the like.

Figure 7:
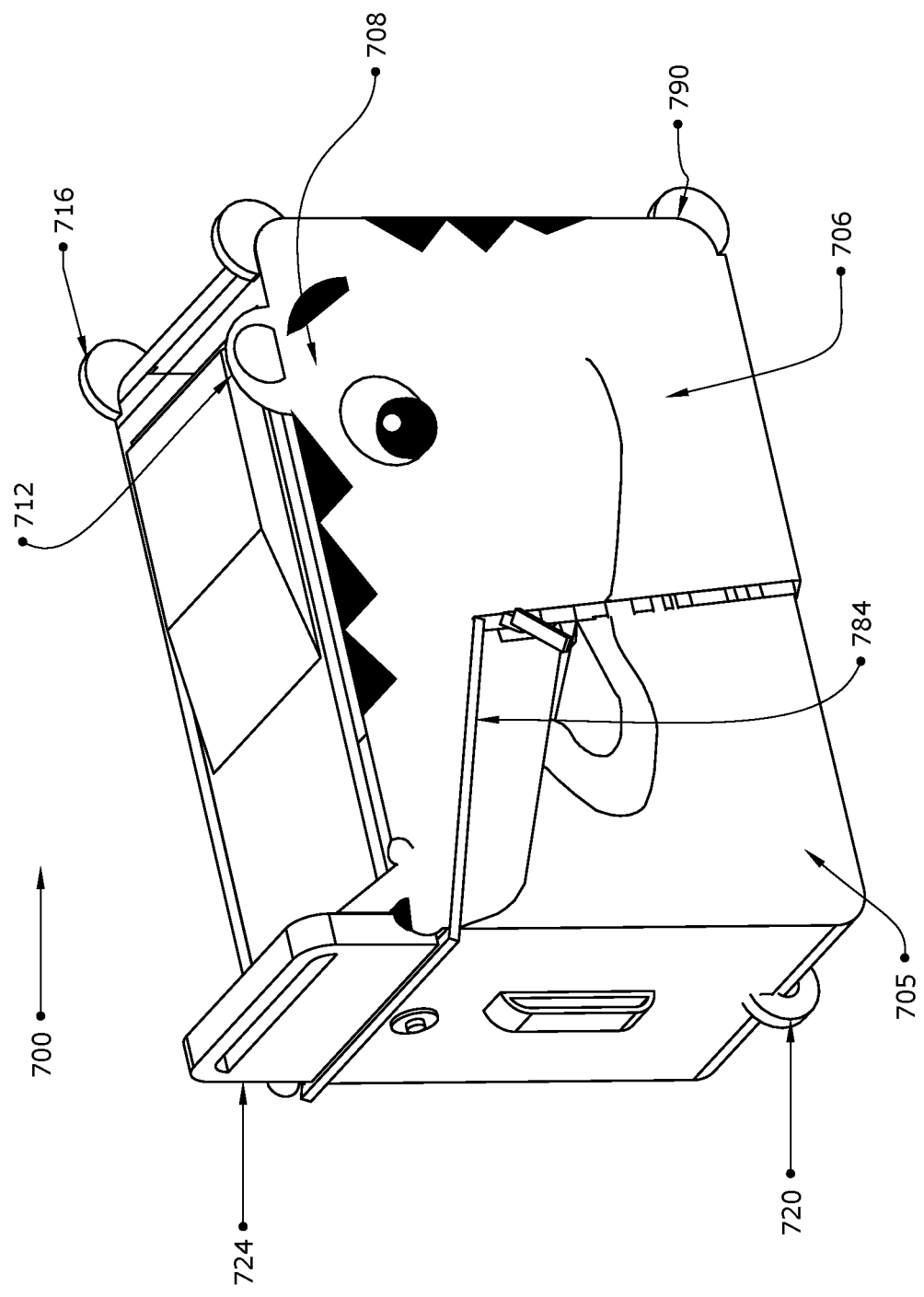
FIG. 7 is another perspective image illustrating another exemplary embodiment of visual design on the outside of the luggage.

FIG. 7 illustrates another embodiment of the multi-functional luggage 700 in a horizontal position. In one example, the luggage when closed displays a visual image. For example, the visual uses the contour 784 formed near the opening of the third frame 705 and the second frame 706. For example, a portion of the first frame 708, second frame 706, and the third frame 705 display a visual image. In one example, the visual image is of an animal that uses the contour 784 as the nose of the animal or the wheels 716, 720 as the ears of the animal. Other design components 712 can be added to complete the visual image on the luggage 700. These design components 712 can be controlled using smart devices or buttons found on the luggage to hide, partially hide or display for amusement purposes or to ensure the luggage 700 fits the size specifications of the airlines. Other visual images may be used and portions of the luggage may be used to complete the visual design. The luggage 700 can be used as a scooter to ride on in a horizontal position as illustrated in FIG. 7. A portion of the ground engaging elements 716, 720, 790 such as wheels can be used to ride the luggage 700. When the ground engaging elements 716, 720, 790 are not used they may be hidden or visually displayed according to settings set by the user by buttons, mobile device, voice commands, or the like or by predetermined settings. The handle 724 can twist to adjust and support the scooter position of the luggage 700. The handle 724 can also be extended and stretched out to different angles to enable the user to comfortably steer the luggage 700. When the third frame 705 and the second frame 706 are in the first position, the wheels 720 may be ground engaging elements into the third compartment 705 or a certain portion may be visible. The portion of the wheels 716, 720, 790 visible may complete a visual pattern or design on the luggage 700. For example, the ground engaging elements 716, 720, 790 may be the ears of an animal visually designed onto the luggage 700 or part of a transforming robot. In another example, the visual design can be a train, car, firetruck, toy characters, dolls or the like. It is understood that the visual image can be any design and any portion of the luggage 700 or any additional elements added on the luggage 700 may be used complete the visual pattern on the luggage 700.

Figure 8:
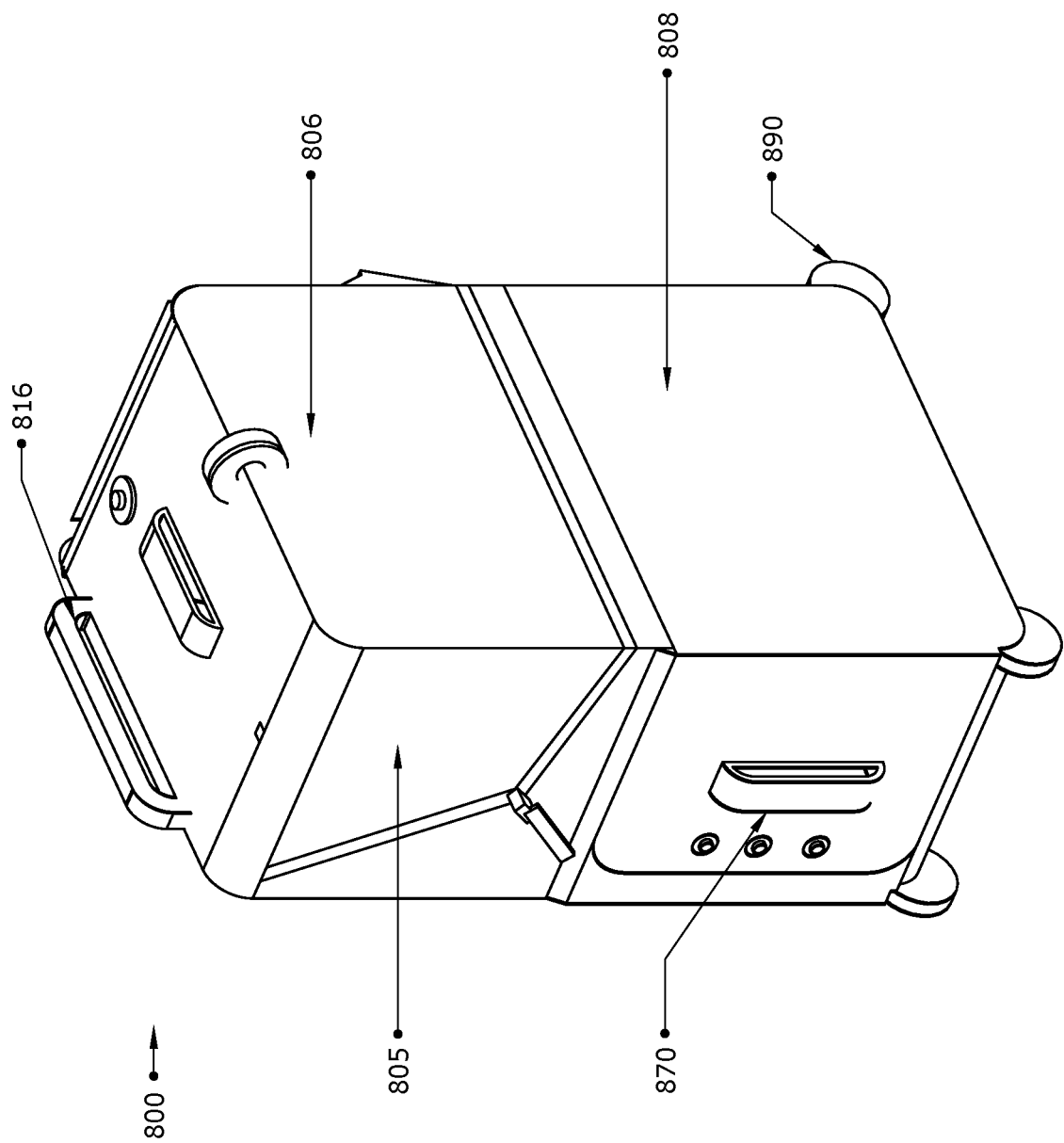
FIG. 8 is another perspective image illustrating another exemplary embodiment of the luggage.

FIG. 8 illustrates another embodiment of the multi-functional luggage 800. In one example, the luggage 800 may be the size that allows it to be carried-on. As such, the carry-on luggage 800 meets the carry-on size limits when the first, second, and third frames 805, 806, and 808 are closed. In another example, the luggage 800 may be the size that allows it to be checked-in instead of carried-on. In one example, elements such as the ground engaging elements 890, handles 816, 870 or the like can be contracted, expanded, hidden, or partially hidden in order to meet the specifications of the airlines.

In other embodiments, the luggage 100, 200, 300, 400, 500, 600, 700, and 800 includes a canopy that provides shade or privacy to the child in the seat. The canopy may also allow for a peek-a-boo window that allows the person operating the luggage to view the child sitting on the seat. It is understood that the luggage 100, 200, 300, 400, 500, 600, 700, and 800 may have mechanisms that allow the user to manually open any part of the luggage. The mechanisms include but are not limited to buttons, hooks, zippers, latches, or the like. In one example, the luggage 100, 200, 300, 400, 500, 600, 700, and 800 can communicate with a user using his mobile device to locate the luggage 100, 200, 300, 400, 500, 600, 700, and 800 or provide status of the stroller i.e. open state or closed state. In another example, the luggage 100, 200, 300, 400, 500, 600, 700, and 800 or a portion of the luggage 100, 200, 300, 400, 500, 600, 700, and 800 can be opened up automatically using a button. The button may be located anywhere on the luggage 100, 200, 300, 400, 500, 600, 700, and 800, for example on the handle bars 216, 316. The luggage 100, 200, 300, 400, 500, 600, 700, and 800 may be opened using voice commands or a mobile device. For example, when a button is pushed, the wheels 136, 162, 220 automatically extend out and the seat compartment opens into a stroller. The seat 256 can be configured to different settings and reclining angles based on different requirements of the child. For example, there can be a sleeping setting, sitting setting, or the like. Other examples include different settings for different children. For example, when infant sits on the stroller, the straps and the reclining angle of the second frame 106, 206, 306, 406, 506, 606 automatically change to make it safe for an infant to sit comfortably in the seat 256, 356, 456 compared to when an older child sits in the portable carrier 356, 356, 456. These settings can be saved or configured using external buttons on the luggage or a mobile device. Voice commands or hand, foot, or body motions may be used for these settings as well. Voice commands or hand motions can also be used to close or open the luggage 100, 200, 300, 400, 500, 600, 700, and 800. The materials used to make the luggage 100, 200, 300, 400, 500, 600, 700, and 800 might be light weight and strong to allow for the easy transportation. In another example, the third frame 105, 205, 305, 405 and/or the second frame 106, 206, 306, 406 can be configured to swivel or be able to be configured to allow the seat 256, 356, 456 to face away from the person operating the luggage 100, 200, 300, 400, 500, 600, 700, and 800 or towards the person operating the luggage 100, 200, 300, 400, 500, 600, 700, and 800. In one example, the first frame 108, second frame 106, and third frame 105 can be divided into multiple parts that work together to form a seat 256, 356, 456 and these parts can be used in different combinations to make a seat 256, 356, 456 for the portable carrier.

Figure 11:
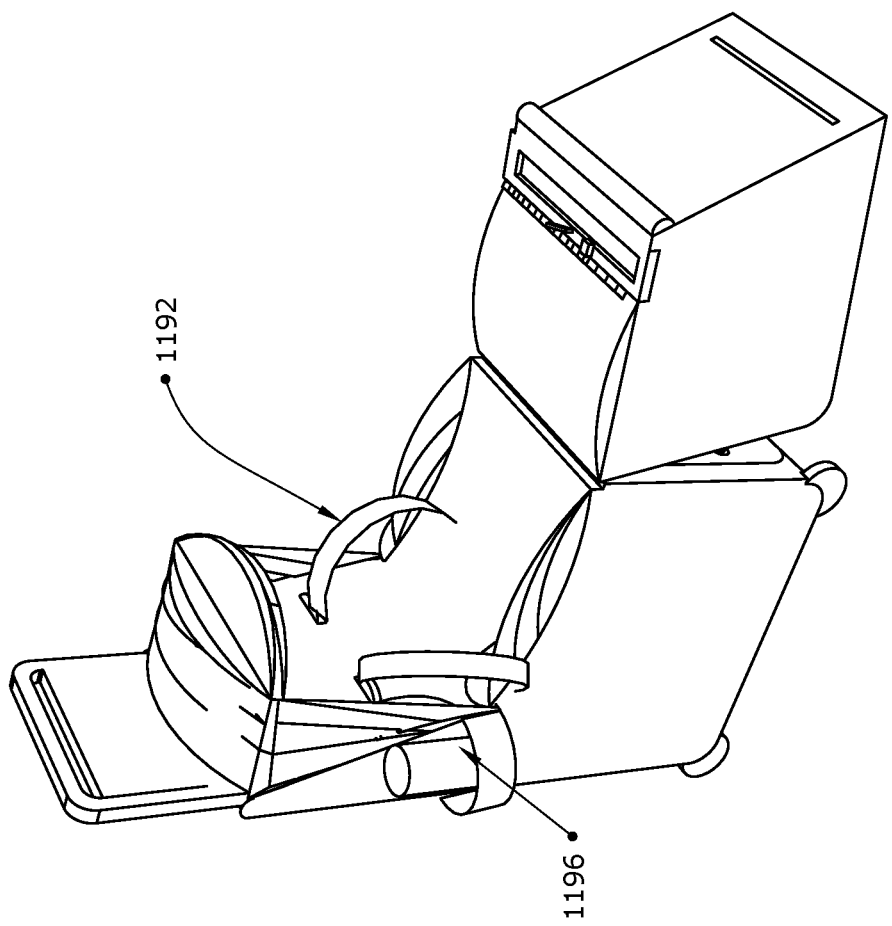
FIG. 11 is another perspective image illustrating another exemplary embodiment of the luggage.
Figure 11:
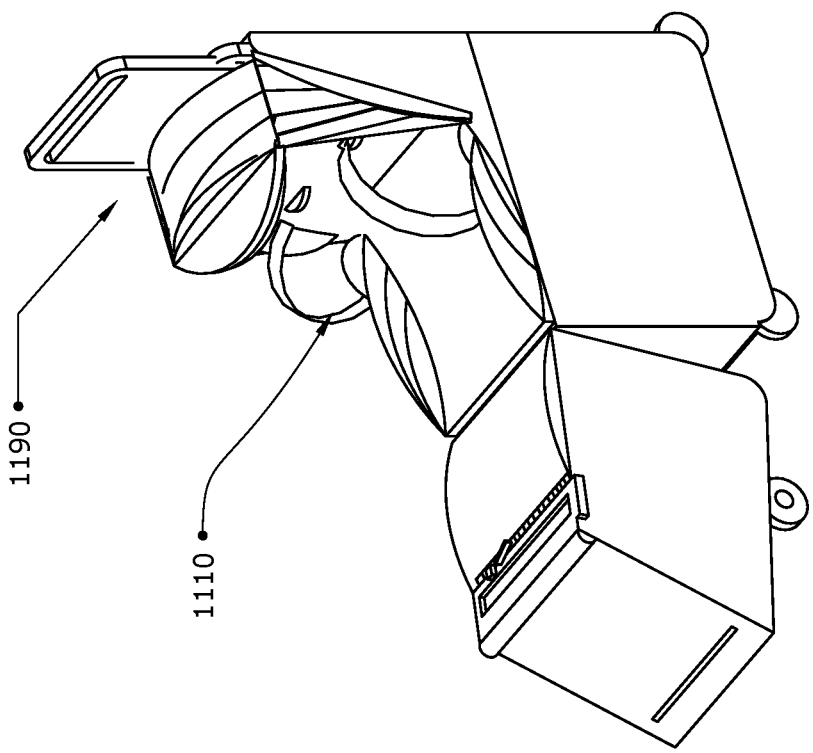

FIG. 11 illustrates another embodiment of the multi-functional luggage. As seen in FIG. 11, the luggage can include a covered structure 1190 that provides shade to the human seated in the portable carrier. The covered structure 1190 can open and close like an accordion fold or a fan fold that allows the covered structure to open and close easily and allow the third frame 105 to be placed in a contiguous position with the second frame 106. The luggage can also include fabric on the sides of the third frame 105, 205, 305, 405 and the second frame 106, 206, 306, 406 that can allow the human to sit inside the portable carrier. The luggage can also include compartments on the side such as a cup holder that can be hidden or be displayed when needed. The luggage can include straps 1192 as well. The straps 1192 can assist the human seated in the seat to be strapped to the seat. The straps 1192 can also allow the third frame 105, 205, 305, 405 and the second frame 106, 206, 306, 406 to be arranged together in a contiguous manner. The straps 1192 can allow the third frame 105, 205, 305, 405 and the second frame 106, 206, 306, 406 to close and lock together. The luggage 100 can also include additional storage 1196 outside the luggage to allow for the storage of cups, electronic devices, food, or the like while the luggage 100 is converted into a portable carrier. This additional storage 1196 can be designed to be hidden or partially hidden when not in use.

Figure 12:
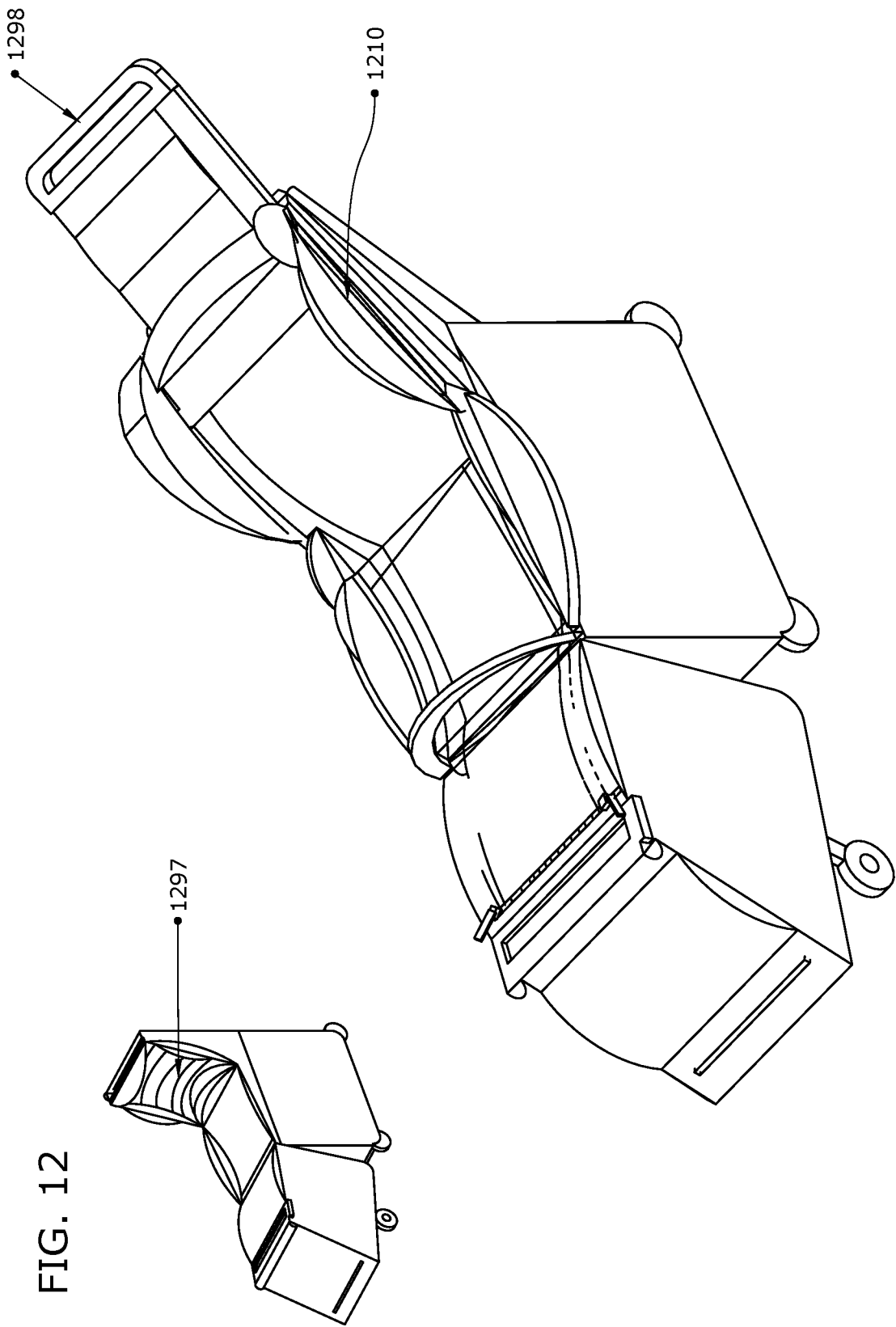
FIG. 12 is another perspective image illustrating another exemplary embodiment of the luggage.

FIG. 12 illustrates another embodiment of the multi-functional luggage. As seen in FIG. 12 in one embodiment, the material 1210 around the portable carrier can be a mesh fabric or any material that can be stretched or contracted. In one example, the material 1210 can be a web-like fabric around the headrest to support the head of the human seated in the portable carrier. The material 1210 can be a strong and a fabric that is expandable that can be pulled out from the luggage and attached and fitted into the upper part of the luggage. The backseat 1297 of the portable carrier can also include additional material that allows the backseat to expand into a reclining position or contract to allow the human seated in the portable carrier to be in an upright seated position. For example, the backseat 1297 can be designed to contract or expand depending upon the seated position of the human in the portable carrier. In one example, the backrest of the portable carrier can move and expand in height 1298 or contract in height 1298 to allow for comfort and support to the head of the human seated in the portable carrier.

Figure 13:
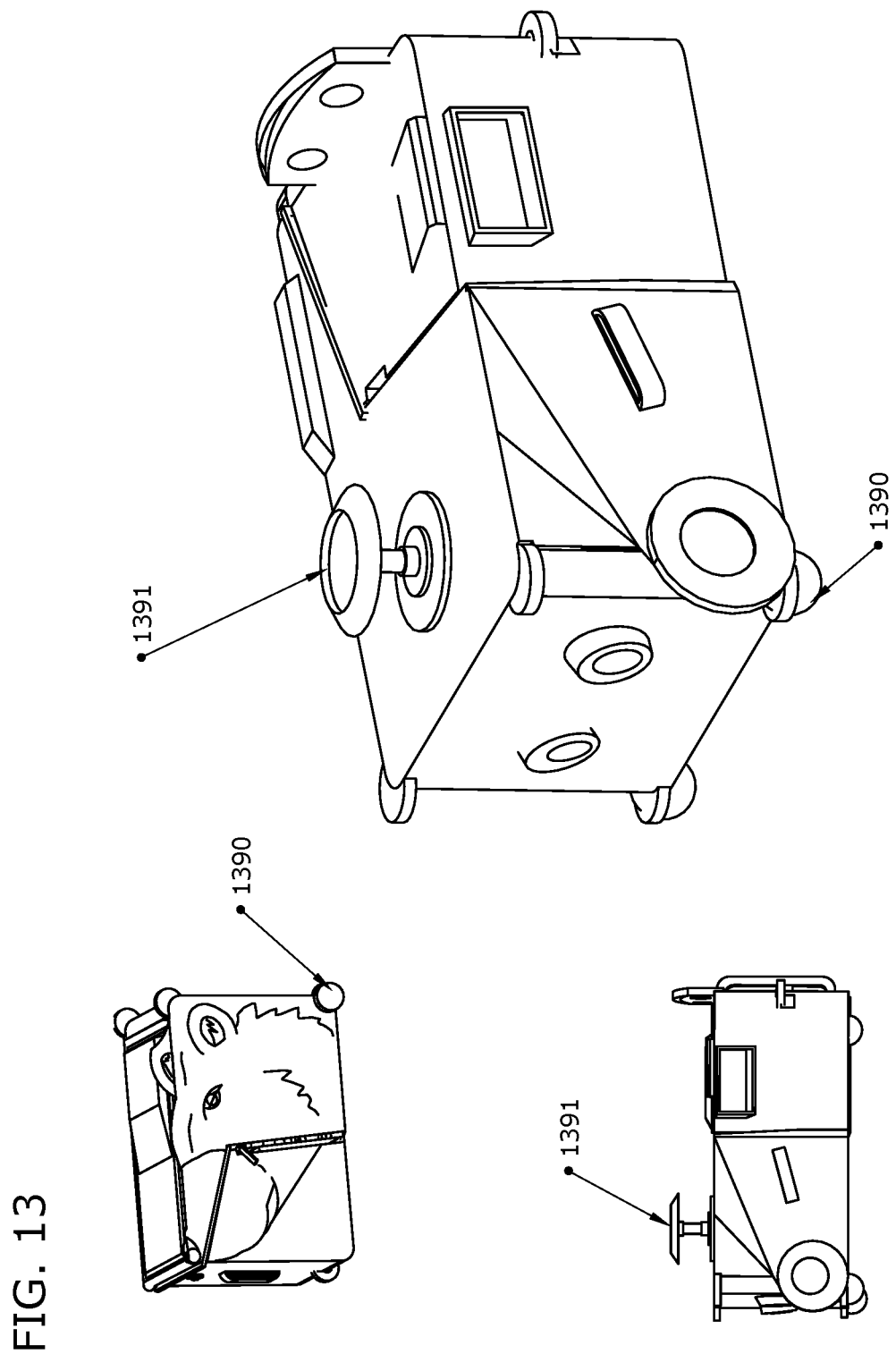
FIG. 13 is another perspective image illustrating another exemplary embodiment of the luggage.

FIG. 13 illustrates other examples of visual designs that can be used on the exterior of the luggage. As seen in FIG. 13, the luggage can display visual designs of animals. The luggage 100 can have other designs for example travel themes such as mountain, sea, globe or transport theme such as city bike, car, truck or the like. The elements and materials around and on the luggage 100 can be used to complete the visual design. In one example, the elements for engaging the ground 1390 can be designed such that they can be rotated, for example rotated at 360 degrees or in different directions such as all directions like a sphere or a ball. In another example, the elements for engaging the ground 1390, 1391 can be expanded or contracted to allow the luggage 100 to be moved in a horizontal position such driven as a scooter or vertical position.

Figure 14:
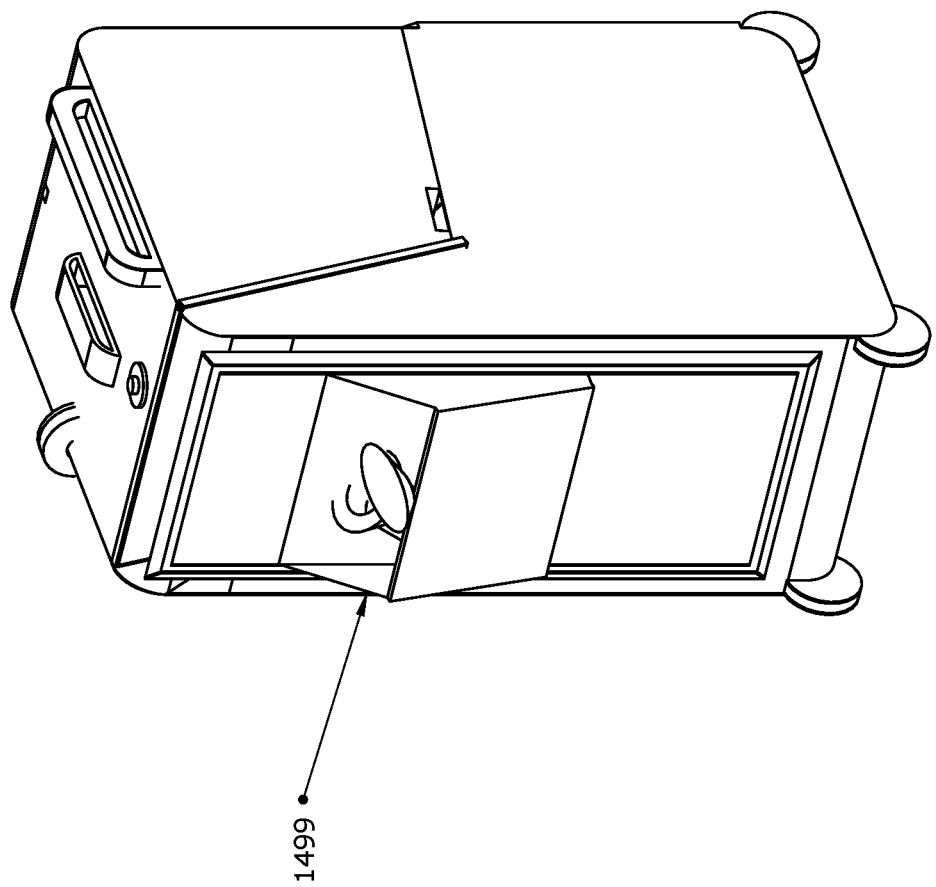
FIG. 14 is another perspective image illustrating another exemplary embodiment of the luggage.

FIG. 14 illustrated another example of the luggage. As seen FIG. 14, the luggage can include additional storage 1499 on the outside of the luggage. This storage 1499 can be hidden or displayed when needed. The storage 1499 can be designed to store laptops, handbags, children toys, cups, food material, or the like.

Figure 9:
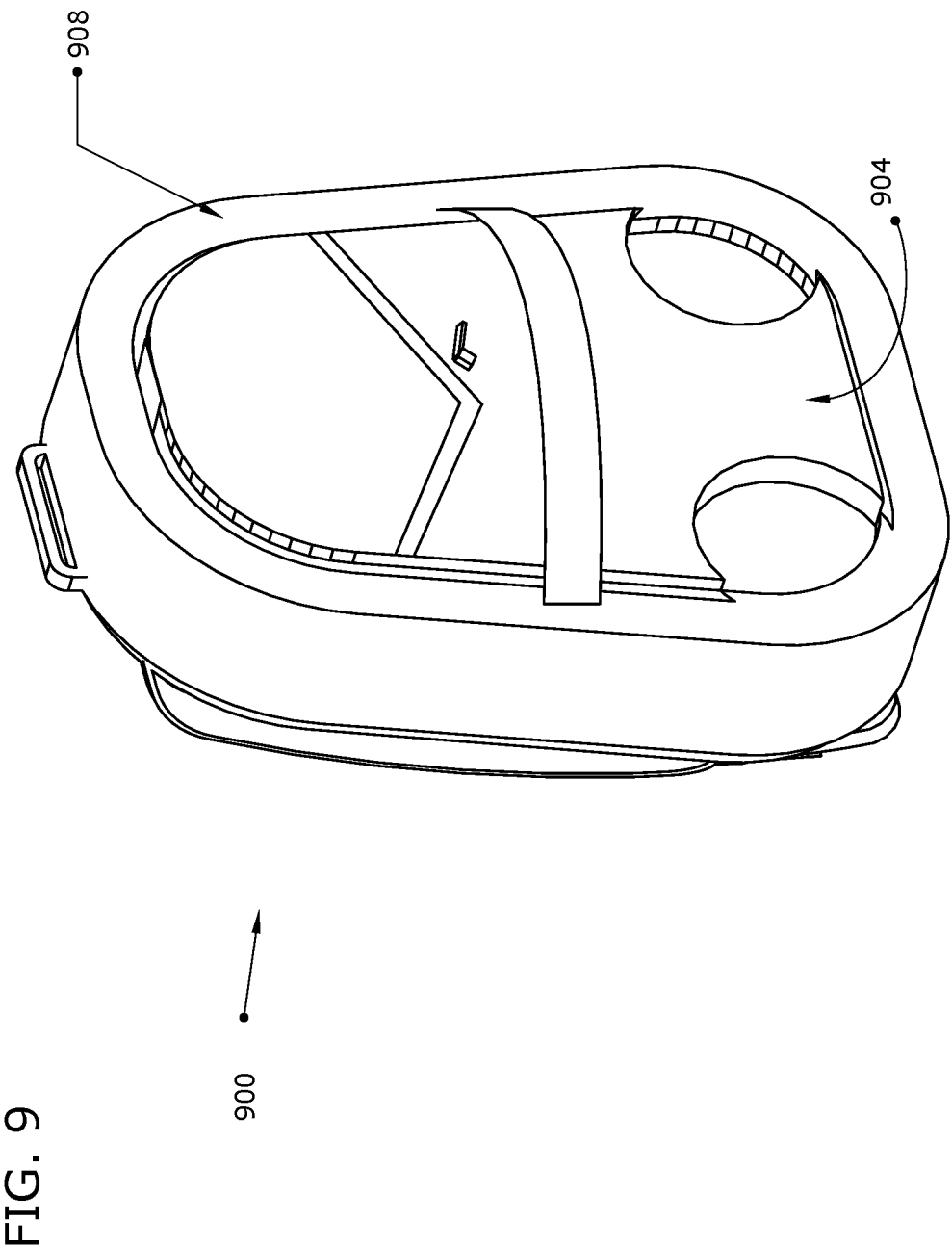
FIG. 9 is another perspective image illustrating another exemplary embodiment of the luggage used as a backpack.
Figure 10:
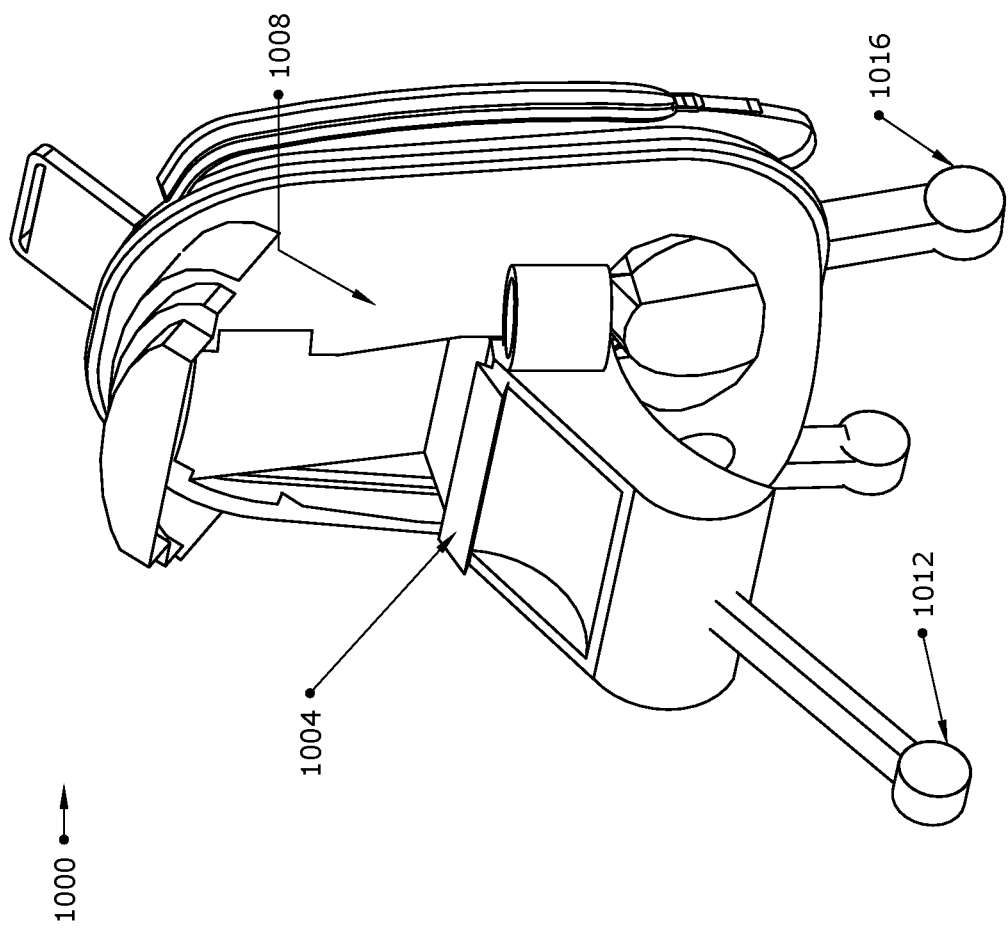
FIG. 10 is another perspective image illustrating another exemplary embodiment of the backpack luggage transforming into a portable carrier.
Figure 10:
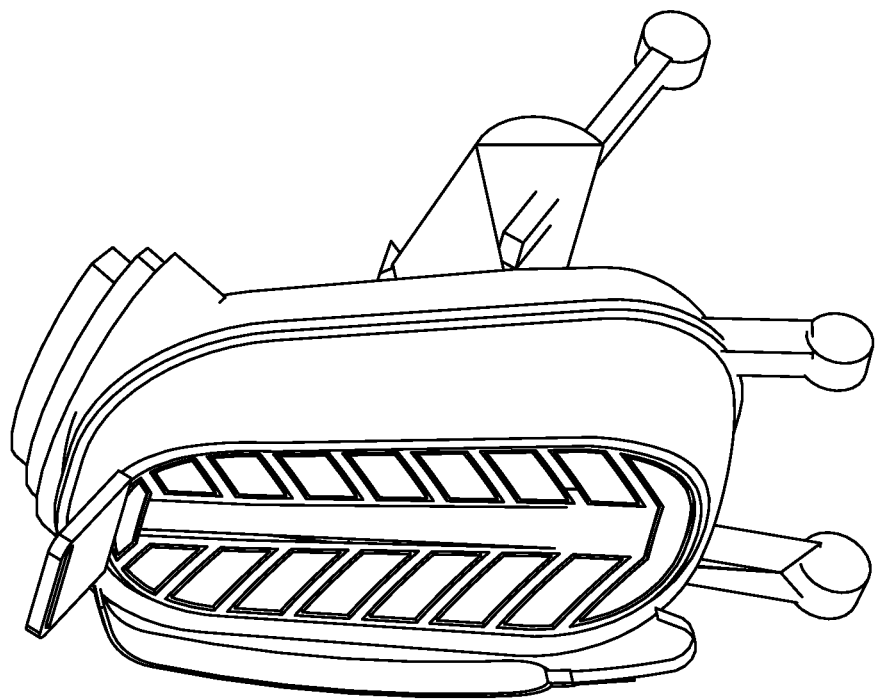

FIGS. 9-10 illustrate another embodiment of the multi-functional luggage 900, 1000. In one example, the luggage 900, 1000 may be a backpack, handbag, diaper bag or the like. For example, the backpack 900, 1000 has two compartments or frames, one seat compartment or frame 904, 1004 and one storage compartment or frame 908, 1008. The seat compartment 904, 1004 flips open into a stroller such as an umbrella stroller. The seat compartment 904, 1004 may have one or more wheels 1012, 1016 that can be designed to be hidden and/or partially hidden when needed or a portion may be displayed. The wheels 1012 may be extended to provide additional support to the stroller when the seat compartment 904, 1004 is opened. The storage compartment 908, 1008 may have additional wheels 1016 that extend out to support the stroller. The luggage 904, 1004 may have straps to strap a child into the seat and padding that allows for comfort to the child sitting in the seat. The seat may be opened and closed using buttons, mobile device, voice commands or the like.

Different embodiments of the luggage according to this disclosure can include different combinations of features described above, along with any other advances or modifications that would be obvious to one of ordinary skill in the art. It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

The present disclosure should be considered as illustrative and not restrictive in character. It is understood that only certain embodiments have been presented and that all changes, modifications and further applications that come within the spirit of the disclosure are desired to be protected.

What is claimed is:

1. A multi-functional luggage comprising:
a two-component frame, the two frame components each forming a frame structure with one or more curved surfaces, each of the two frame components surrounded by and supporting an enclosure, the two enclosures each forming a luggage compartment;
the two frame components rotatably connected at respective edges using a hinge, the hinge arranged to permit the two frame components to rotate relative to each other into a luggage configuration with a pair of surfaces of the two frame structures substantially aligned with and coextensive with each other, the entire two-component frame in the luggage configuration designed to function as transportation luggage;
the hinge further arranged to permit the two frame components to rotate relative to each other into a seat configuration with another pair of surfaces of the two frame structures substantially aligned with and coextensive with each other, the entire two-component frame in the seat configuration being arranged as a seat supporting structure designed to serve as a seat; and
one or more handles designed to adjust and lock into a height and an angle to support the seat supporting structure based on the orientation of a back rest formed by one of the two frame components,
wherein each of the two frame components include a portion of a seating surface of the seat that is separate from the back rest such that the seating surface forms the seat bottom of the seat.

2. A multi-functional luggage, comprising:
a frame component surrounded by and supporting one or more enclosures, the enclosures forming respective luggage compartments, the frame component and enclosures configured to rotate a portion of the frame component into a seat configuration,
wherein in the seat configuration, the frame component and enclosures are arranged to form a seat supporting structure supporting a seating surface at a height suitable for seating a human and to form the back rest designed to move between and lock into a plurality of orientations between an upright orientation and a reclined orientation relative to the seating surface;
wherein at least two separate portions of the frame component include a portion of the seating surface of the seat that is separate from the back rest such that the seating surface forms the seat bottom of the seat.

3. The multi-functional luggage of claim 2, wherein the frame component includes a hinge that permits the frame component and enclosures to rotate into the seat configuration, and
wherein the hinge further permits the frame component and enclosures to rotate into a luggage convenient for transportation.

4. The multi-functional luggage of claim 2, wherein the bases of the two frame components include one or more ground engaging elements, a height of the each of the frame components is designed to be equal to each other, both heights measured from their respective ground engaging elements to their respective seating surfaces.

5. A multi-functional luggage comprising:
a two-component frame, the two frame components each forming a frame structure with one or more curved surfaces, each of the two frame components surrounded by and supporting an enclosure, the two enclosures each forming a luggage compartment;
the two frame components rotatably connected at respective edges using a hinge, the hinge arranged to permit the two frame components to rotate relative to each other into a luggage configuration with a pair of surfaces of the two frame structures substantially aligned with and coextensive with each other, the entire two-component frame in the luggage configuration designed to function as transportation luggage; and
the hinge further arranged to permit the two frame components to rotate relative to each other into a seat configuration with another pair of surfaces of the two frame structures substantially aligned with and coextensive with each other, the entire two-component frame in the seat configuration being arranged as a seat supporting structure designed to serve as a seat,
wherein each of the two frame components include a portion of a seating surface of the seat that is separate from a back rest such that the seating surface forms the seat bottom of the seat.

6. The multi-functional luggage of claim 5, wherein:
a frame-component designed to extend from the frame structures to form the back rest, the back rest designed to move between and lock into a plurality of orientations between an upright orientation and a reclined orientation relative to the seating surface.

7. The multi-functional luggage of claim 2, further comprising:
cushions deployed on the seating surface of the seat supporting structure designed to expand and provide comfort.

8. The multi-functional luggage of claim 2, wherein:
the seat supporting structure includes bellow pleats designed to operably connect to the back rest and to the seating surface and further designed to extend or contract based on the orientation of the back rest.

9. The multi-functional luggage of claim 2, wherein:
the bases of the two frame components include one or more ground engaging elements and a height of the each of the frame components designed to be equal to each other, both heights measured from their respective ground engaging elements to their respective seating surfaces.

10. The multi-functional luggage of claim 9, wherein:
the ground engaging element of one of the frame components is designed to adjust and lock into a height and an angle relative to the seating surface of the frame component.

11. The multi-functional luggage of claim 10, wherein:
the ground engaging element of one of the frame components is designed to adjust and lock into a height and an angle based on the orientation of the back rest.

12. The multi-functional luggage of claim 10, wherein:
the ground engaging element of the one of the frame components is designed to retract into the frame component.

13. The multi-functional luggage of claim 10, wherein:
the ground engaging element of the one of the frame components is designed to be positioned on an outer surface of the frame component.

14. The multi-functional luggage of claim 5, wherein:
in the seat configuration, the seating surface includes a releasable connection disposed along a portion of an outer surface of the two compartment frames and designed to provide access to the luggage compartments in one or more of the two-compartment frames.

15. The multi-functional luggage of claim 14, wherein:
the releasable connection includes at least one of zippers, button, or latch.

16. The multi-functional luggage of claim 1, wherein:
a surface of the luggage forms a graphical figure using at least one of structural elements of the luggage and a defined contour formed by the two frame structures aligned with each other.

17. The multi-functional luggage of claim 5, further comprising:
one or more handles designed to retract and extend and lock into to a height and an angle to support the luggage.

18. The multi-functional luggage of claim 5, further comprising:
one or more handles are designed to adjust and lock into a handle height and a handle angle to support the seat supporting structure based on the orientation of the back rest and further designed to retract and extend and lock into to the handle height and the handle angle to support the luggage;
cushions deployed on the seating surface of the seat supporting structure designed to expand and provide comfort;
wherein the seat supporting structure includes bellow pleats designed to operably connect to the back rest and to the seating surface and further designed to extend or contract based on the orientation of the back rest;
wherein the bases of the two frame components include one or more ground engaging elements and a frame height of the each of the frame components is equal to each other, both frame heights measured from their respective ground engaging elements to their respective seating surfaces;
wherein the ground engaging element of one of the frame components is designed to adjust and lock into an element height and an element angle relative to the seating surface of the frame component and further designed to adjust and lock into the element height and the element angle based on the orientation of the back rest and further designed to retract into the frame component and further designed to be positioned on an outer surface of the frame component;
wherein in the seat configuration, the seating surface includes a releasable connection disposed along a portion of an outer surface of the two compartment frames and designed to provide access to the luggage compartments in one or more of the two-compartment frames;
wherein the releasable connection includes at least one of zippers, button, or latch; and
wherein a surface of the luggage forms a graphical figure using at least one of structural elements of the luggage and a defined contour formed by the two frame structures aligned with each other.

19. The multi-functional luggage of claim 5, further comprising:
one or more handles designed to adjust and lock into a height and an angle to support the seat supporting structure based on the orientation of the back rest formed by one of the two frame components.

20. The multi-functional luggage of claim 5, wherein one of the two frame components includes the back rest.

* * * * *